Sept. 16, 1952  C. G. STRANDLUND  2,610,456
SPIKE TOOTH HARROW
Filed May 11, 1945  2 SHEETS—SHEET 2
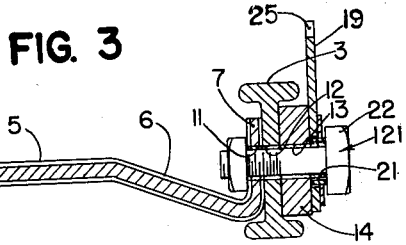
FIG. 3
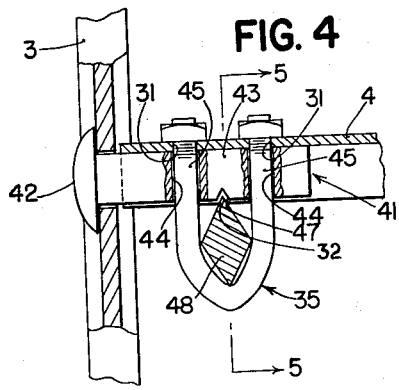
FIG. 4
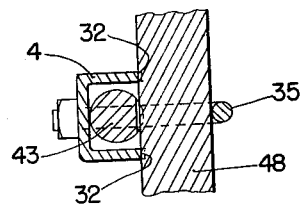
FIG. 5
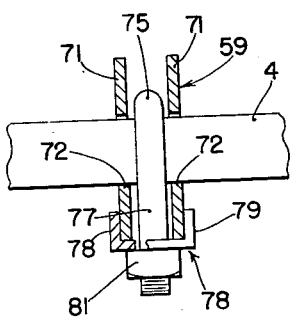
FIG. 6
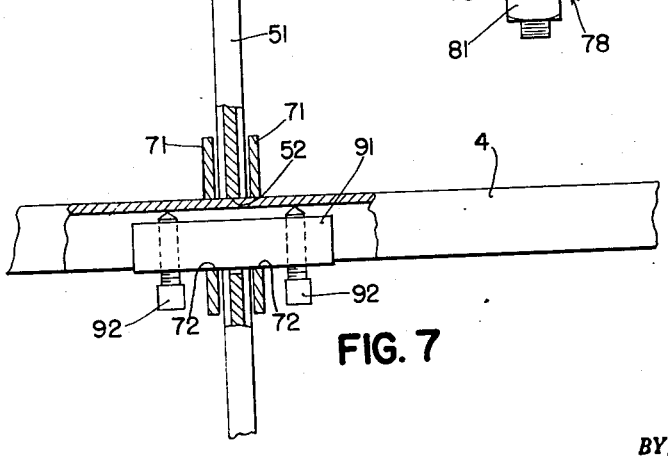
FIG. 7
WITNESS
E. B. Bjurstrom
INVENTOR.
CARL G. STRANDLUND
BY 
ATTORNEYS Patented Sept. 16, 1952

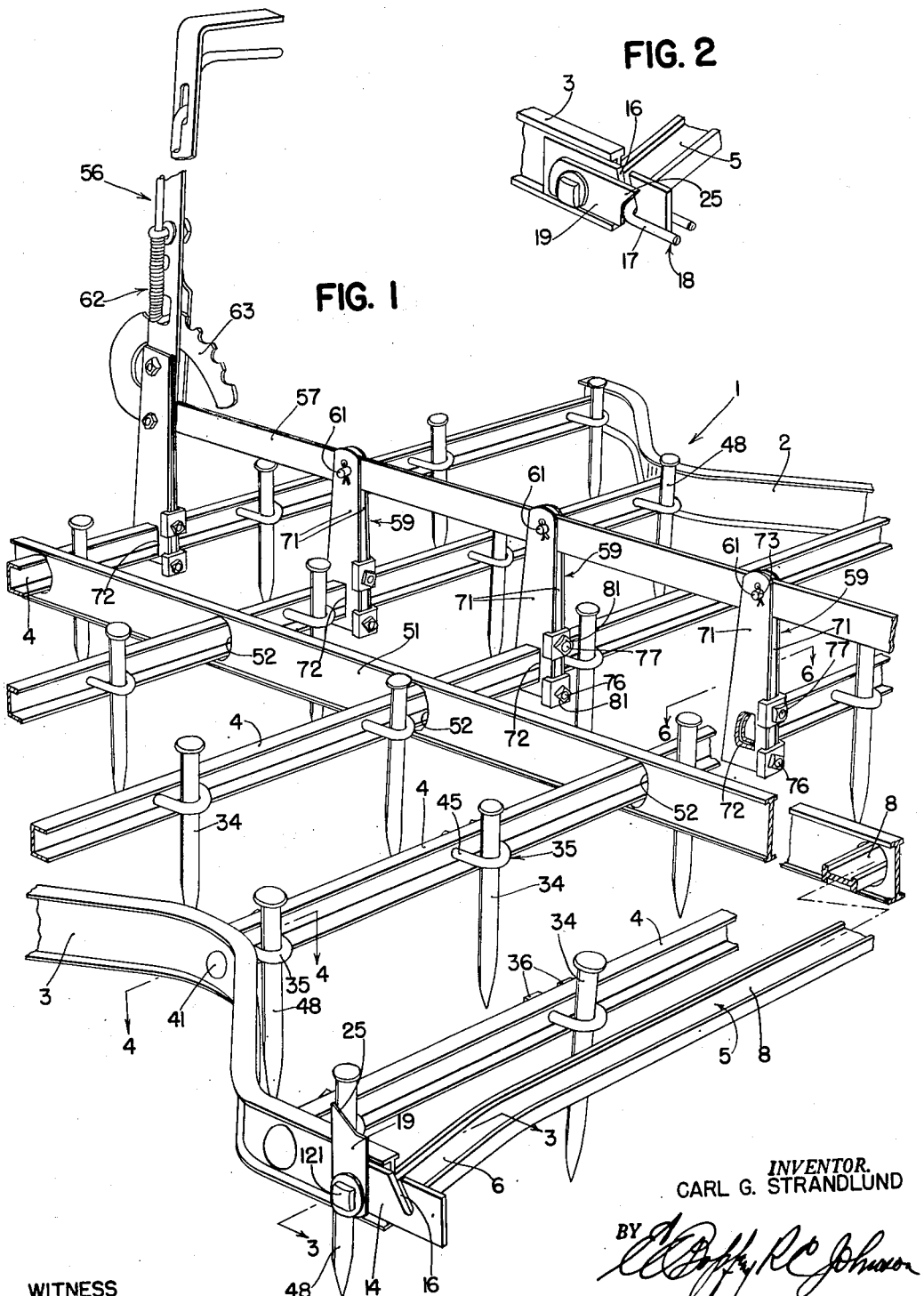

2,610,456

UNITED STATES PATENT OFFICE 2,610,456

SPIKE TOOTH HARROW

Carl G. Strandlund, Moline, Ill., assignor to Deere & Company, Moline, Ill., a corporation of Illinois Application May 11, 1945, Serial No. 593,189

2 Claims. (Cl. 55—103)

The present invention relates generally to farm implements and more particularly to spike tooth or drag harrows.

The object and general nature of the present invention is the provision of a new and improved harrow which is inexpensive to manufacture but is strong and sturdy in operation. More particularly, it is a feature of this invention to provide a new and improved harrow wherein a strong but simple and inexpensive angling arm construction is provided for each tooth bar. More particularly, it is a feature of this invention to provide a spike tooth harrow of the closed end type and in which the front tooth bar is disposed fairly closely adjacent the transverse frame bar which is secured to the front ends of the side bars.

These and other objects and advantages of the present invention will be apparent to those skilled in the art after a consideration of the following detailed description.

In the drawings:

Figure 1 is a partial perspective view of a spike tooth harrow in which the principles of the present invention have been incorporated.

Figure 2 is a detailed perspective view of one of the hitch connections.

Figure 3 is an enlarged sectional view taken generally along the line 3—3 of Figure 1.

Figure 4 is a fragmentary sectional view taken along the line 4—4 of Figure 1.

Figure 5 is a section taken generally along the line 5—5 of Figure 4.

Figure 6 is a section taken along the line 6—6 of Figure 1, showing one form of the rocker arm construction which forms a part of the present invention.

Figure 7 shows a modified form of arm construction.

Referring now more particularly to Figure 1, the frame of the harrow is indicated by the reference numeral 1 and comprises a pair of end bars 2 and 3, each being of generally I-beam section, and apertured at a plurality of points to receive the tooth bars 4 which will be referred to below in detail. The front member of the frame 1 includes a transverse bar 5 having each of its end sections bent downwardly, as at 6, and bent upwardly, as at 7, at generally a right angle to the general axis of the bar 5. A central section 8 of the bar 5 is disposed substantially in a plane that passes through the tooth bars and the central portions of the side bars 2 and 3. Each upturned section 7 of the front transverse bar 5 is apertured, as at 11, and a bolt 121 is inserted through each opening 11 and the registering openings 12 and 13 formed in the front end of the associated side bar 3 and the rear portion of a draft hook member 14. The forward end of each draft hook member 14 is formed with a rearwardly and upwardly extending slot 16 which is adapted to receive a link 17 of a draft connection 18 that extends forwardly to an evener bar (not shown) or some other hitch means. Each link 17 is normally held in place by a locking member 19 which is swingably mounted on a bushing 21 clamped between the head 22 of the bolt 121 and the adjacent side of the draft hook member 14. The bolt 121 acts through the bushing 21 to firmly and securely clamp the bar 14 to the frame bars 3 and 7. The vertical dimension of the draft hook member 14 is such that it fits snugly between the upper and lower flanges of the associated side frame member 3 so that the draft hook members 14 form rigid extensions of the harrow frame, yet the locking links 19 are freely swingable into and out of positions holding the hitch links in place. Each locking link 19 is provided with an extension 25 which engages the hitch link 17 when the latter is in position in the draft hook member for limiting the downward movement of the associated locking link 19 beyond it locking position, as best shown in Figure 2.

Each of the tooth bars 4 is preferably formed as a channel member and the pivotal mounting of each tooth bar in the associated side frame bars 2 and 3 will now be described. Each tooth bar 4 is provided with a plurality of pairs of openings 31 and in a position between the openings, the upper and lower flanges of each tooth bar are notched, as at 32. The teeth 34 are held in position in the notches 33 by U-bolts 35 that embrace the associated teeth 34 and have their sides extended through the openings 31 so that when the nuts 36 of the U-bolt are tightened the teeth 34 are firmly clamped in position. The pivot connection at each end of each tooth bar is made up of a pivot member 41 having a head 42 and a shank 43 that is apertured, as at 44, to receive the side sections 45 of the associated U-bolt 35. The shank 43 is also notched, as at 47, and the parts are so dimensioned that when the associated end tooth 48 is clamped in position by the U-bolt 35, the edge of the tooth seats in the tooth bar notches 32 and not in the notch 47 formed in the pivot shank 43 whereby tightening the U-bolt 35 will act through the tooth to secure the latter at upper and lower points firmly and rigidly to the upper and lower flanges of the tooth bar. However, the notch 47 in the end tooth 48 is sufficiently close to the tooth so that the pivot pin 41 is held against any substantial movement relative to the associated clamping U-bolt 35. Hence, very little looseness develops between the pivot and the clamping U-bolt. The shank 43 of the pivot member is so dimensioned as to fit snugly within the channel portion of the tooth bar 4. There is sufficient clearance between the head 42 and the pivot member 43 and the end of the tooth bar 4 to accommodate free rocking of the tooth bar but lateral displacement of the tooth bar is prevented. Fore and aft displacement of the central portions of the several tooth bars 4 is restrained by a central brace member 51 which is apertured, at 52, to rockably receive the several tooth bars. The front end of the brace member 51 is provided with a slot or opening, similar to the aperture 52, to receive the front transverse member 5 of the frame 1 whereby rearward displacement of the brace bar 51 is prevented by virtue of its connection with the front transverse frame member 5. It will be noted that the forwardmost tooth bar 4 is disposed just rearwardly of the front transverse member 5. The latter therefore relieves the tooth bars of a large part of the lateral thrusts which would have to be sustained by the tooth bars if the transverse frame member 5 were not provided.

The several tooth bars 4 are rocked together by means of a hand lever 56 and associated parts whereby the angle of the teeth 34, 48 may be adjusted as desired. A longitudinal angling link 57 is connected to each tooth bar 4 except the rearmost bar by an arm construction 59 to which detailed reference will be made below. The longitudinal link 57 is apertured at a number of points to receive pivot members 61, which may be in the form of a rivet having a head at one end and a cotter at the other to hold the same in position and to retain the link 57 connected with the several arms 59. The lower portion of the lever 56 is formed like the arm construction 59 and carries detent mechanism 62 to which it cooperates with a sector 63 formed on the rear portion of the forwardly bent section of the link 57 for locking the tooth bars 4 in different positions.

The arm construction 59, mentioned above, will now be described. Each tooth bar arm comprises a pair of identical plate members 71 having an aperture 72 formed in the wider end to receive the tooth bar 4. Preferably, the aperture 72 is shaped similar to a cross section of the tooth bar 4. The smaller ends of each pair of plates 71 are apertured, as at 73, to receive the pivot member 61, and the plates 71 are spaced apart only sufficient to receive therebetween the rocking link 57 and a U-bolt 75, the central portion of which embraces the associated tooth bar 4 and the end sections 76 and 77 of which pass through clips 78 which are provided with lip sections 79 overlapping the associated edges of the arm plates 71. Tightening the nuts 81 on the several U-bolts 75 serves to clamp the plates 71 firmly and rigidly to the associated tooth bar and, at the same time, holds the plates 71 against lateral displacement on the tooth bar 4. The lower end of the hand lever 56 is formed and secured to the rear tooth bar 4 in a manner similar to the arm construction just described, and hence further description is unnecessary. This provides a very simple arm construction that is inexpensive to manufacture and assemble but yet is strong and sturdy. The entire tooth bar rocking mechanism, comprising the hand lever 56, link 57 and arms 59 may, if desired, be shifted to different positions along the tooth bars 4 merely by loosening the associated U-bolts 75 and making the desired change in location of these parts.

A modified form of arm construction is shown in Figure 7. In this form the same plates 71 are employed as described above. However, instead of having the U-bolt 75 for the principal attaching means, a clamping bar 91 is provided and is disposed generally longitudinally of the channel tooth bar 4. Each end of the clamping bar 91 is provided with a tapped opening in which a set screw 92 is disposed. By turning the set screws 92, the bar 91 may be forced laterally away from the tooth bar 4 and thus engage the adjacent edges of the openings 72 in the plates 71. This firmly clamps the two arm plates 71 to the associated tooth bar. One advantage of this construction is that, if desired, the arm plates 71 may be assembled about the bracing bar 51, since the clamping bar 91 may readily pass through the opening 52 in the bracing bar 51, the opening 52 being sufficiently large to accommodate the necessary clamping movement of the bar 91. By virtue of this arrangement the bracing bar 51 is held against lateral displacement by the associated arm plates 71 but without requiring any additional parts.

While I have shown and described the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A spike tooth harrow comprising a generally U-shaped frame having side members and a forward transverse connecting member, the latter member comprising a transverse bar having its ends bent into a generally vertical position and apertured, each of said side bars comprising members receiving the bent end portions of said front transverse bar, and means for fastening the bent end portions of said transverse bar to the forward ends of said side bars, the end portions of said forward transverse connecting member having, immediately inwardly of said vertically disposed apertured ends, downwardly bent portions, thereby the central portion of said transverse member between said downwardly bent portions is disposed substantially in the generally horizontal plane of the central portions of said end bars, the apertures in said vertically bent ends of the forward transverse connecting member being disposed in said generally horizontal plane and a plurality of transverse tooth bars pivotally connected at their ends to said side bars in the generally horizontal plane of said side bars, and a bracing member having apertures receiving said tooth bars and the forward portion of said bracing bar being adapted to receive the central portion of said front transverse bar the apertures in said bracing member lying substantially in said generally horizontal plane, whereby stresses transmitted from one tooth bar to the other and to said transverse connecting member are applied in substantially said plane.

2. A spike tooth harrow comprising a generally U-shaped frame having side members and a forward transverse connecting member, the latter member comprising a transverse bar, the width of which exceeds its thickness and the ends of said bar being bent into a generally vertical position and apertured, each of said side members comprising bars receiving the vertically bent end portions of said front transverse bar, and means for fastening the vertically bent end portions of said transverse bar to the forward ends of said side bars so that the generally central portions of said transverse bar is disposed in a generally horizontal plane, whereby the bar is adapted to resist fore-and-aft directed stresses applied thereto, a plurality of transverse tooth bars pivotally connected at their ends to said side bars, and a bracing member having portions pivotally receiving said tooth bars and having its forward portion connected with the generally central portion of said front transverse bar whereby generally fore-and-aft directed forces applied to the tooth bars are resisted, at least in part, by the rigidity of said front transverse bar against deflection in a generally fore-and-aft direction.

CARL G. STRANDLUND.

REFERENCES CITED

The following references are of record in the file of this patent:

UNITED STATES PATENTS

| Number | Name | Date |
|---|---|---|
| 171,197 | Tracy | Dec. 4, 1875 |
| 217,194 | Bednar | July 18, 1879 |
| 366,160 | Evans | July 5, 1887 |
| 518,912 | Brown | Apr. 24, 1894 |
| 578,371 | Strait | Mar. 9, 1897 |
| 603,446 | Hoke | May 3, 1898 |
| 633,333 | Beall | Sept. 19, 1899 |
| 1,008,147 | Heylman | Nov. 7, 1911 |
| 1,054,712 | Percy | Mar. 4, 1913 |
| 1,184,754 | Kiel | May 30, 1916 |
| 2,236,780 | Oerman | Apr. 1, 1941 |
| 2,258,433 | Zink | Oct. 7, 1941 |

FOREIGN PATENTS

| Number | Country | Date |
|---|---|---|
| 583,164 | France | Oct. 27, 1924 |